(12) United States Patent
Miller et al.

(10) Patent No.: US 6,582,490 B2
(45) Date of Patent: Jun. 24, 2003

(54) PRE-FORM FOR EXHAUST AFTERTREATMENT CONTROL FILTER

(75) Inventors: Robert K. Miller, Indianapolis, IN (US); Z. Gerald Liu, Madison, WI (US); William C. Haberkamp, Cookeville, TN (US); Barry M. Verdegan, Stoughton, WI (US); Murray R. Schukar, Fitchburg, WI (US); A. Caner Demirdogen, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/935,847

(22) Filed: Aug. 23, 2001

(65) Prior Publication Data

US 2002/0162310 A1 Nov. 7, 2002

Related U.S. Application Data

(63) Continuation-in-part of application No. 09/573,747, filed on May 18, 2000, now Pat. No. 6,444,006.

(51) Int. Cl.[7] .............................................. B01D 29/07
(52) U.S. Cl. ............................. 55/520; 55/521; 55/523; 55/524; 55/DIG. 5; 55/DIG. 30
(58) Field of Search .......................... 55/520, 521, 523, 55/524, DIG. 30, DIG. 5

(56) References Cited

U.S. PATENT DOCUMENTS

| | | |
|---|---|---|
| 1,924,472 A | 8/1933 | Thomson |
| 2,553,054 A | 5/1951 | Lincoln et al. |
| 3,112,184 A | 11/1963 | Hollenbach |
| 3,966,646 A | 6/1976 | Noakes et al. |
| 4,017,347 A | 4/1977 | Cleveland |
| 4,028,252 A | 6/1977 | Morris |
| 4,398,931 A | 8/1983 | Shevlin |
| 4,410,427 A | 10/1983 | Wydeven |
| 4,430,223 A | 2/1984 | Miyakawa et al. |
| 4,652,286 A | 3/1987 | Kusuda et al. |
| 5,042,249 A | 8/1991 | Erdmannsdoerfer |
| 5,075,160 A | 12/1991 | Stinton et al. |
| 5,194,078 A | 3/1993 | Yonemura et al. |
| 5,196,120 A * | 3/1993 | White ........................ 210/504 |
| 5,196,170 A | 3/1993 | White |
| 5,207,807 A | 5/1993 | Manfre et al. |
| 5,250,476 A | 10/1993 | Mogensen et al. |
| 5,298,046 A | 3/1994 | Peisert |
| 5,322,537 A | 6/1994 | Nakamura et al. |
| 5,376,218 A | 12/1994 | Mito et al. |
| 5,456,069 A | 10/1995 | Haerle |
| 5,562,825 A | 10/1996 | Yamada et al. |
| 5,567,536 A | 10/1996 | Lintz et al. |
| 5,611,832 A | 3/1997 | Suzuki et al. |
| 5,876,537 A * | 3/1999 | Hill et al. ................. 156/89.11 |
| 5,895,574 A | 4/1999 | Friedmann et al. |
| 5,908,480 A | 6/1999 | Ban et al. |
| 6,238,561 B1 * | 5/2001 | Liu et al. ................. 210/493.4 |
| 2002/0090324 A1 * | 7/2002 | Badeau et al. .............. 422/171 |

OTHER PUBLICATIONS

Monolithic Metal Oxide Thin–Wall Substrates with Closed and Open Cells: Optimal Designs by Theoretical Modeling and Experiment, Eugene Shustorovich, Victor Shustorovich, Konstantin Solntsev, SAE 2001 World Congress, Mar. 5–8, 2001.

\* cited by examiner

*Primary Examiner*—Robert A. Hopkins
(74) *Attorney, Agent, or Firm*—Andrus, Sceales, Starke & Sawall, LLP

(57) ABSTRACT

A green uncured pre-form (10) for an exhaust aftertreatment filter includes first and second sheets (12 and 14) of regenerable filter material, the second sheet being pleated and forming with the first sheet a plurality of axially extending flow channels (32, 80, 81) having lateral cross-sectional shapes with two adjacent included angles (34 and 36, 56 and 58) each greater than 45° and less than 75° and having wall segments (18 and 20, 68 and 70) with a thickness less than 0.8 mm, a porosity greater than 80%, and an extension height (b) between pleat tips less than 10 mm. Forming apparatus (83, 84) and methods are provided.

27 Claims, 4 Drawing Sheets

PRE-FORM FOR EXHAUST AFTERTREATMENT CONTROL FILTER

CROSS-REFERENCE TO RELATED APPLICATIONS

This application is a continuation-in-part of U.S. patent application Ser. No. 09/573,747, filed May 18, 2000 now U.S. Pat. No. 6,444,006.

BACKGROUND

The parent invention of the above noted '747 application relates to a high temperature, composite ceramic filter having particular use as a diesel engine exhaust filter, and to a method of forming the same.

As regulatory agencies have recently mandated the reduction of particulate emissions in diesel engines, there has been increased activity in the development of exhaust gas filters for diesel engines. A typical exhaust filter will trap the particulate material contained in the exhaust stream, and to prevent clogging of the filter and the resultant increase of load on the engine due to increased back pressure, the particulate material is then burned from the filter.

As a diesel engine exhaust filter must have high temperature resistance and durability, it has been proposed to utilize ceramic materials as the filter media. For example, a ceramic filter for use in gas turbine engines is described in U.S. Pat. No. 4,017,347. In this patent, a ceramic tape or sheet is prepared from a slurry containing ceramic particles and a two-resin binder system composed of a thermoplastic resin and a thermosetting resin. The tape is formed into a filter structure and the structure is then fired to sinter the ceramic particles and burn out the organic constituents, thus producing a sintered ceramic cellular structure.

U.S. Pat. No. 5,322,537 discloses an exhaust gas filter for diesel engines composed of ceramic fibers, such as alumina-silicate fibers, and an inorganic binder having a softening temperature lower than that of the ceramic fiber.

U.S. Pat. No. 4,652,286 also describes a ceramic exhaust filter for diesel engines having a corrugated or honeycomb structure made of sheets consisting of ceramic fibers and a fire clay binder.

A variety of structures are used to control diesel exhaust emissions, including extruded monolithic structures and corrugated spiral structures. These suffer a variety of shortcomings, depending on the specific design, including high thermal mass, high restriction, low capacity, and poor durability. Diesel emission control filters (DECF) including diesel particulate filters (DPF), diesel oxidation catalyst (DOC), and other types of flow-through and wall-flow filters, typically use a cylindrical geometry with flow in an axial direction through channels, also oriented axially. To create the axial channels, the diesel emission control filter element may be an extruded honeycomb monolith, or a spiral wound structure of alternating layers of corrugated and flat filter media, or a spiral wound structure of alternating layers of pleated and flat filter media. The present invention provides improvements in the latter type.

The noted parent invention is directed to a high temperature composite ceramic filter having particular use as a diesel engine exhaust filter, and to a method of making the same.

In carrying out the parent invention, an aqueous slurry is initially produced containing random length ceramic fibers, organic fibers and a water soluble thermoplastic binder. The ceramic fibers, such as alumina, have high temperature resistance, being stable to temperatures above 1000° C. The organic fibers can take the form of natural or synthetic materials.

The slurry is formed into a paper-like sheet by conventional papermaking techniques, and the sheet is subsequently dried to evaporate the water and provide a dry flexible sheet.

The sheet is then formed into a green three-dimensional article suitable for filtering. Preferably, the final shape is that of a spirally wound, honeycomb element, composed of flat and corrugated layers, with a colloidal solution of a ceramic material used as an adhesive to join the sheets together along contiguous areas. Opposite ends of alternate channels within the honeycomb structure are sealed by a high temperature cement.

As a feature of the parent invention, the green filter structure is coated with an intermediate binder to increase its temperature stability. In one form of the parent invention, the intermediate binder consists of a solvent solution of an uncured thermosetting resin, such as a phenol-formaldehyde resin. The coated part is then air dried and heated to a temperature generally in the range of about 150° C. to 250° C. to crosslink the resin and rigidify the structure. The structure is then pyrolyzed at a temperature generally in the range of 900° C. to 1000° C. in an inert or non-oxidizing atmosphere to convert the organic constituents, i.e. the organic fibers and thermoplastic binder, to carbon char. Firing the structure in the inert atmosphere eliminates gassing of the organic constituents and yields a part suitable for final binder application.

A final coating of silicon carbide is then applied to the filter structure using a conventional chemical vapor deposition process. The silicon carbide coats the haphazardly arranged ceramic fibers, as well as the junctions or intersections between the fibers. The resulting structure is a composite of ceramic fibers, inorganic binders and carbon char, coated with silicon carbide.

In a modified form of the parent invention, the green filter structure is coated with an aqueous colloidal solution of an inorganic material, such as alumina or alumina-silicate binders. The part is then air dried, heated to a temperature of about 200° C. to 300° C. to remove solvents and dehydrate the colloidal material and then fired at a temperature of 900° C. to 1100° C. in air to remove the organic components. Following this, the final coating of silicon carbide is applied using the chemical vapor deposition process.

The silicon carbide coating thickness is controlled to a level of about 0.5 to 1.5 microns, so that the porosity of the filter structure is not adversely affected and is maintained at a value of 80% void or greater. Because of the silicon carbide coating, the resulting composite filter has improved mechanical strength, 6,000 kPa or greater having been shown, which is 50–100% higher than can be achieved by bonding or sintering the fibers alone. Additionally, there is no significant degradation or loss of pores within the structure so that resistance to gas flow is minimal.

With the method of the parent invention, a green state part is produced with a production capable process and the geometry of this part is maintained throughout conversion to a high temperature ceramic composite, and this geometry will be retained at the elevated temperatures of about 650° C. to 700° C. needed to regenerate a contaminated filter.

The present invention arose during continuing development efforts relating to the noted parent invention. The present invention provides a green uncured pre-form for subsequent manufacture, e.g. by curing and rigidization, into an exhaust aftertreatment filter suitable preferably for use to control diesel exhaust emissions, for example diesel particulates, nitrous oxide (NOX), carbon monoxide (CO), and/or other hydrocarbon emissions. The pre-form is preferably a cylindrical, porous, ceramic structure with alternating layers of flat and pleated fibrous media. It is formed by rolling together a pleated layer of media bound to a flat layer using a suitable adhesive which facilitates fabrication and handling and ensures structural integrity of the finished filter. The channels formed by the intersection of the rolled pleated and flat layers run in an axial direction to the cylindrical structure of the pre-form along its length. Lower restriction and greater structural strength is provided, including crush strength which is desirable for packaging and sleeving the element in the finished product. Particular geometries have been found to improve performance.

The walls of the pre-form have a porosity greater than 80% and are made from fibrous filter media. In its green uncured state, the media with both pleated and flat layers contains greater than 80% by weight of fibers with suitable thermal and chemical resistance for exhaust gas temperatures and conditions, including alumina, alumina-silica, and silicon carbide. The media contains less than 20% of fugitive and other materials and fibers, as well as intermediate binders to facilitate processing by imparting wet strength, increasing tear and cut resistance, and increasing flexibility and pliability of the media during manufacturing. These fugitive and other materials may include, inter alia: synthetic fibers, microfibers and/or pulps, such as Kevlar, cellulose, acrylic, acetate, polypropylene, polyester, and nylon; organic emulsion polymer resins such as acrylic, vinyl chloride, nitrile, polyvinyl acetate, or thermosetting materials, like phenolic or epoxy; inorganic glass microfibers, that are primarily $SiO_2$; miscellaneous chemicals, such as acid, alum, etc. to control pH and aid dispersion; colloidal cellulose, including carboxy methyl cellulose; and inorganic particles or colloidal material, such as alumina, alumina-silica, silicon carbide, rare earth and/or mixed metal oxides. Some of these materials may incinerate or change their physical form during curing to increase the porosity of the final filter product. The media thickness is less than 0.8 mm (millimeters), and, ideally should be 0.5 mm or less, in order to reduce restriction. Together, the high porosity and thin walls of the media reduce the thermal mass of the product making it easier to heat and regenerate the filter, relative to extruded monolithic structures.

When the pre-form is processed into a diesel particulate filter, it works in a wall-flow mode with alternating ends of the channels plugged in order to force the flow of exhaust gases through the porous walls of the filter. The plugging material must adhere to the media, plug the ends of the channels, and be able to survive exhaust conditions. Typically, a suspension with properties compatible with the filter media and containing metal oxides with or without silicon carbide is used. When used as a substrate for a catalyst for the removal of NOX, CO and/or hydrocarbon emissions, the ends are not plugged and the porous wall structure of the pre-form increases the surface area available for the chemical reactions.

The present invention further provides forming apparatus for the above noted pre-form and methods of configuring and shaping same.

Due to the geometry of diesel emission control filters and the properties of the media, an alternative to conventional pleating and corrugation methods is needed to optimize the noted characteristics of the diesel emission control filter. In preferred form, specifically, it is desirable that the diesel emission control filter use pleated media with either triangular or trapezoidal cross-sections, rather than corrugated media with a sinusoidal shaped cross-section. The difference is significant for greater strength, stability, and structural integrity. This is particularly desirable in the present exhaust aftertreatment filter application because force is typically applied in a radial direction to seal and hold the filter element in place. The pleat height is less than 10 mm, and preferably less than 6 mm.

Conventional methods, including score-roll pleating and corrugation, cannot produce media with the noted desired geometry and structure. Pleating is commonly done by score-rolling, wherein the media passes between two rollers with male and female spikes and slots that score the media. The media then passes through downstream gathering wheels that feed the media against an opposing force. The inherent stiffness of the media causes the media to fold or crease into pleats along the score lines. For this reason, score-roll pleating is unsuitable for pliable media with insufficient stiffness, such as the ceramic media used in the above noted diesel emission control filter. Another limitation is that the desired small pleat heights, e.g. less than 10 mm, cannot be obtained by the noted score-roll pleating method. Furthermore, creasing along the noted score lines can damage the media pleat tips for some types of filter media, including that used for the noted diesel emission control filter.

Another possibility is to use corrugation for producing a diesel emission control filter. In this method, corrugated rollers are used to imprint a shape onto the media, instead of creasing and folding the media as is done with other pleating methods. The limitation of the noted corrugation method is that the pleats have a sinusoidal cross-section, rather than triangular or trapezoidal. As above noted, triangular or trapezoidal flutes or channels are desired, with cross-sectional geometries which are more structurally stable and provide for more laminar flow.

In one aspect of the present invention, a star gear pleating method is used to produce the pleated media pre-form for a diesel engine control filter. Particularly designed interlocking gears pass the media between one or more sharp tips of a gear tooth on one gear and a particularly formed root of the opposing gear. The teeth can be modified to provide triangular or trapezoidal pleats. The gears fold and gather the media without crushing it and without adversely affecting the performance of the final filter product. As the media is released from the interlocking gears, it is directed forward and out of the gears by guide bars which prevent the media from tending to follow the gears and become damaged. The present method does not rely on media stiffness to fold and crease the media, and hence it can be used on more pliable media without damage to the pleat tips. The media is partially gathered and folded between the interlocking teeth of the gears, which partial gathering helps prevent unwanted jams or reverse pleating otherwise common with score-roll pleating. The present method and forming apparatus allows much shorter pleat heights and faster pleating without damaging the media or breaking the fibers. In contrast to corrugation, the present technique produces straight sided triangular or trapezoidal pleats. The present technique further eliminates the need to use extruded ceramic monoliths for diesel emission control filters.

BRIEF DESCRIPTION OF THE DRAWINGS

FIG. 1 is a perspective view of a pre-form in accordance with the invention.

FIG. 2 is a microphotograph showing the fibrous nature of the pre-form.

DETAILED DESCRIPTION

Parent Application

Figure 1:
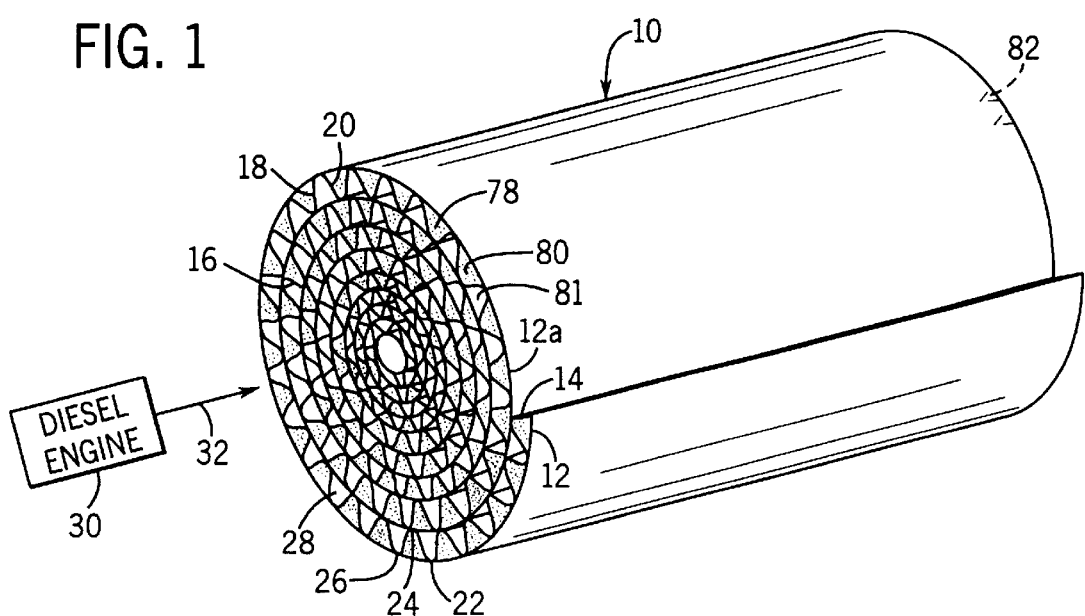
FIGS. 1 and 2 are taken from the noted parent application.
Figure 2:
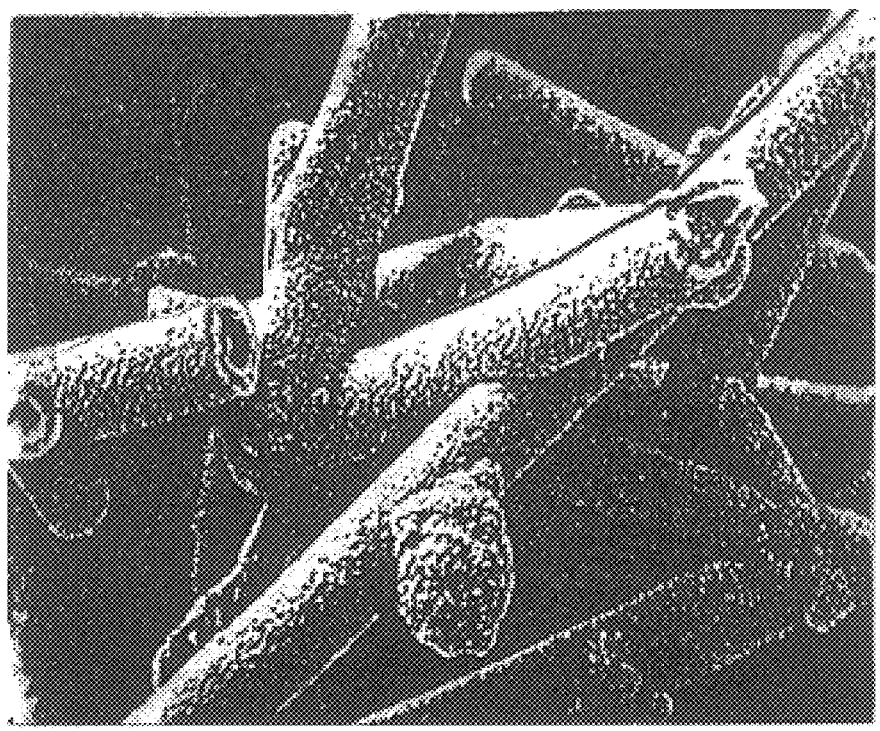

The following description of FIGS. 1 and 2 is taken from the noted parent application.

In carrying out the parent invention, a slurry is initially produced consisting of ceramic fibers, organic fibers, a thermoplastic binder, and a liquid carrier, preferably water.

The ceramic fibers are composed of a material that can withstand temperatures up to about 1200° C. and can take the form of alumina, aluminosilicate, aluminoborosilicate, mullite, and the like. The ceramic fibers have a diameter generally in the range of 1 to 20 microns, and preferably about 2 to 7 microns, and have a length in the range of 0.1 to 10 mm. In general, a length to diameter ratio greater than 100 is desired. On a solids basis, the ceramic fibers generally comprise from 50% to 80% by weight of the slurry and preferably about 70% to 80%. The ceramic fiber is preferably a high purity alumina, such as Saffil, containing less than 5% silica and other impurities.

The organic fibers can be natural fibers, such as wood fibers or hemp, or can be synthetic fibers, such as nylon, rayon, polyester, polypropylene, polyethylene, aramid, acrylic, and the like. On a solids basis, the organic fibers comprise from about 10% to 50% by weight solids of the slurry, and preferably from 15% to 25%. In a preferred form of the parent invention, the organic component can consist of a combination of about 10% to 15% by weight of wood pulp fibers and 10% to 15% by weight of synthetic aramid fibers, such as poly-paraphenylene terephthalamide (Kevlar®). The wood pulp fibers, such as northern softwood fibers, improve the wet web strength of the sheet as it is formed on the papermaking machine.

The synthetic organic fiber component is preferably a highly refined or fibrillated type, such as Kevlar wet pulp, and provides mechanical entangling of the ceramic fibers and significantly improves the resistance of the sheet to cutting and tearing allowing it to be pleated or folded without damage. An organic component such as Kevlar maintains its integrity at elevated temperatures, required to cure thermosetting resin binders that may be subsequently added. Kevlar fibers also char to a high carbon content in an inert atmosphere which is beneficial in one of the methods in carrying out the invention.

The thermoplastic binder is preferably a water soluble latex, such as an acrylic latex, Hycar 26138 (BF Goodrich), or the like, and is employed in the slurry in an amount of 2% to 20% by weight of solids, and preferably in the range of 2% to 10%. The thermoplastic binder has a glass transition temperature above normal ambient temperature, 25° C. or greater, and provides flexibility so that the sheet can be subsequently formed into a three-dimensional configuration.

In addition, it may be desirable to add a pH control agent to the slurry to reduce the pH of the aqueous slurry, so that the latex will more readily attach to the fibers. A typical material is alum (ammonium aluminum sulfate) although other materials may be, used to produce a pH of about 5.5 to 6.5.

The amount of water used in the slurry is not critical and should be such that it provides the slurry with a consistency where it can be readily fed from a conventional headbox of a papermaking machine onto a porous moving belt or support in a conventional manner to provide a thin sheet or web. The sheet can be vacuum dried on the porous belt and then subsequently heat dried to remove the remaining water or carrier. The resulting dried sheet consists of haphazardly arranged ceramic and organic fibers bonded by the thermoplastic resin. The dried sheet is flexible and can be folded or deformed and has a porosity generally in the range of 80% to 95% with a mean flow pore diameter of about 10 to 15 microns. The sheet generally has a weight of about 125 to 175 grams per square meter and a thickness of about 0.75 to 1.0 mm. The tensile strength of the dried sheet is greater than 1500 kPa which is suitable for high speed pleating or corrugating processes.

The dried sheet or web can then be formed into any desired three-dimensional article suitable for a filter. The preferred configuration is that of a spirally wound element composed of alternate flat and pleated sections, thus providing a honeycomb structure. More specifically, a first section of the dried sheet is folded or scored to provide a plurality of parallel pleats or corrugations. Alternately, the section can be formed into sinusoidal, rather than angular pleats. In the preferred method, the pleats in cross section define equilateral triangles.

The formed layer or section is then laminated to a flat sheet section and an inorganic, or mixed organic/inorganic, binder is applied to the tips of the folds or flutes to increase the bonding between the layers. The inorganic binder may take the form of a high viscosity, high solids suspension of colloidal alumina or aluminosilicate that provides the high temperature resistance required in the finished filter. The organic component in the binder may take the form of an acrylic latex, polyvinyl chloride, polyvinyl alcohol or starch. The organic component acts to increase the tack and surface adhesion of the adhesive.

As the two layers are laminated, the ends of the channels defined by the pleats or flutes at one edge of the pleated sheet are then sealed using a high temperature cement or sealant, such as an alumina complex that may contain particles of alumina or other high temperature material. The sealant may also contain a small amount of an organic material, such as an acrylic latex, polyvinyl chloride, polyvinyl alcohol or starch to improve tack and a surfactant to increase its wetting of the sheet.

The composite structure can then be wound in a spiral fashion to produce a green filter structure, as illustrated in FIG. 1, and the ends of the channels at the opposite edge of the pleated sheet are sealed in a similar manner to create opposing flow channels, thus forcing gas flow through the sheet material in the final product.

In accordance with the parent invention, an intermediate binder is then applied to the green filter structure to increase its temperature stability. In one form of the invention, a liquid, uncured, thermosetting resin is applied to the green structure, preferably by dipping the structure into the liquid. Various thermosetting resins can be employed as the intermediate binder, such as phenol formaldehyde, urea formaldehyde, epoxy, and the like. The intermediate binders are applied as a solvent solution, and it is preferred to use an uncured phenol formaldehyde resin in a 2% to 5% by weight solution in alcohol.

After application of the uncured thermosetting resin, the structure is air dried to remove the alcohol or carrier and then cured at a temperature of about 150° C. to 250° C. in order to fully crosslink the resin. The resulting structure is no longer thermoplastic in nature, and has increased rigidity so it can be readily handled without deformation.

Following the application of the thermosetting resin, the structure is pyrolyzed in an inert or non-oxidizing atmosphere to fully reduce the organic components to carbon char. The inert atmosphere may be an atmosphere such as nitrogen, and the pyrolyzing is generally carried out at a temperature of about 900° C. to 1100° C. The carbon char acts as a binder to maintain the integrity of the filter structure which is relatively weak, but is temperature stable.

After removal of the organic components through pyrolyzation, a coating of silicon carbide is applied to the structure using a conventional chemical vapor deposition process. The deposition is accomplished in near vacuum at an elevated temperature of about 100° C. The vapor deposition process is a conventional type, as described in Vapor Deposition, edited by Powell, C. F., J. H. Oxley, & J. M. Blocker, Wiley, New York (1966).

The resulting structure is a composite of haphazardly arranged ceramic fibers, inorganic binder and residual carbon char with a silicon carbide coating that fully covers the fibers, binders and intersections between the fibers. A photomicrograph of the final structure is illustrated in FIG. 2. The vapor deposition of silicon carbide is applied to the entire matrix and is controlled to a thickness of about 0.5 to 1.5 microns. With this thickness, the porosity of the sheet is maintained and is typically about 80% void or greater. Minimal blocking or clogging of the pores in the sheet occurs due to the vapor deposition of the silicon carbide.

The resulting composite filter structure consisting primarily of ceramic fibers and silicon carbide is stable at elevated temperatures of about 650° C. to 700° C. needed to regenerate a filter contaminated with particulate material.

The silicon carbide coating rigidifies the structure, so that the geometry of the structure from the green state is maintained.

In order to minimize flow restriction through the filter, it is preferred that the pleats have a generally equilateral triangle cross section, with the length of a side of the triangle being in the range of 2 to 6 mm and a channel length in the range of 7 to 42 cm. The efficiency and restriction of the complete structure can also be tailored by leaving some portion of the defined channels unsealed or similarly leaving a larger orifice or channel open in the center of the wound structure. A central core may also provide beneficial for a mechanical support mechanism.

The filter media has a degree of texture that is opposed to the flow direction and can be further textured with the addition of inorganic cement material on its outer diameter, thus, improving friction between the filter and its mounting system which is beneficial at high pressure drops encountered as the filter contaminates accumulate.

The filter structure is also suitable for the addition of catalytic materials to improve the oxidation of collected contaminants or reaction upon gaseous species.

The composite ceramic filter of the invention has a high porosity, generally above 80% voids, which reduces engine restriction.

The fibrous filter has improved particle capture efficiency and has increased contaminant holding ability due to the high void content, increased surface area and depth loading. In addition, the filter has high temperature resistance and resilience because of its composite nature.

While FIG. 1 shows the filter as a spirally wound honeycomb structure, the filter can also take other configurations, such as alternate stacked flat and corrugated sheets.

The following examples illustrate the method of producing the composite ceramic filter.

EXAMPLE I 10.5 grams of alumina fibers having an average fiber diameter of 3 microns and length of about 0.01 to 10.0 mm was dispersed in 5000 grams of water to form a slurry or suspension. 1.8 grams of wood fibers were mixed along with 1.8 grams of Kevlar wet-pulp fibers in 1000 grams of water in a Waring blender and then added to the alumina fiber. Also added to the suspension was 2 grams of an acrylic latex binder containing 50% solids. The pH was reduced to 6.0 with the addition of aqueous alum. The suspension was further diluted with 15,000 grams of water. The slurry was then formed into a paper-like sheet using a conventional 12"×12" square papermaking mold machine. The sheet was dried at a temperature of 150° C. and the resulting dried sheet had a porosity of 90%, a mean flow pore diameter of 12 microns, a weight of 150 grams per square meter, and a thickness of 0.95 mm.

Multiple sheets of paper were cut into sections each having a width size of 7.5 cm. One strip was corrugated or pleated on a conventional pleating/corrugating machine, and the peaks of the corrugations were adhered to a flat strip section with an adhesive consisting of a high viscosity colloidal suspension of alumina and latex adhesive. Ends of the channels defined by the flutes at one edge of the corrugated sheet were then sealed by an alumina complex cement. The combined layers were then rolled into spiral form and the ends of the channels at the opposite edge of the corrugated sheet were similarly sealed to create opposing flow channels.

The green spirally wound filter structure was then dipped into a 2% by weight solution of phenol formaldehyde resin in alcohol. The structure was then air dried to evaporate the solvent and heated to a temperature of 175° C. to fully cross-link the resin.

The filter structure containing the thermosetting resin coating was then slowly heated to a temperature 1000° C. in a nitrogen atmosphere for a period of 72 hours causing the organic components to convert to carbon char.

Following the pyrolyzation, a coating of silicon carbide was applied to the structure using a conventional chemical vapor deposition process. In this process, the filter structure was maintained at near vacuum and a temperature of about 1000° C. Through this process a coating of silicon carbide having an average thickness of 0.8 microns was applied to the fibrous structure of the filter.

The resulting filter structure had a porosity of 90% and consisted of haphazardly arranged ceramic fibers, inorganic binders, carbon char and a coating of silicon carbide.

EXAMPLE II

A green filter structure was prepared as described in Example I. The filter structure was then dipped in a 7% by weight colloidal suspension of alumina and the part was then air dried and then heated to a temperature of 250° C. to remove all solvents and dehydrate water. Subsequently, the part was fired at a temperature of 1100° C. in air to remove all the organic components, thus resulting in a structure consisting primarily of haphazardly arranged ceramic fibers and inorganic binders.

The filter structure was then subjected to a chemical vapor deposition process to coat the fibers and the intersections between fibers with a coating of silicon carbide, as described in Example I.

Present Invention

The present invention provides a green uncured pre-form 10, FIG. 1, for an exhaust aftertreatment control filter. The pre-form includes first and second sheets 12 and 14 of regenerable filter material, as described above. Sheet 14 has a plurality of pleats such as 16 defined by wall segments 18, 20, etc. extending in zig-zag manner between pleat tips 22, 24, 26, etc., FIGS. 1, 3, at axially extending bend lines. The pleat tips such as 22 and 26 on one side of sheet 14 are in contiguous relation with sheet 12 and preferably bonded thereto with an inorganic binder, as above, and define axial flow channels such as 28. Sheets 12 and 14 are preferably, though not necessarily, wound or rolled into a spiral, FIG. 1. In a spiral-wound or other multilayer stack, the pleat tips such as 24 on the other side of sheet 14 engage sheet 12 of the next layer, for example as shown at 12a, FIG. 3. In one embodiment, the green uncured pre-form is then supplied to a second stage manufacturer for curing and rigidization. The pre-form is cured and rigidized, as noted above, to an exhaust aftertreatment filter for filtering engine exhaust from an engine such diesel engine 30 flowing axially therethrough at 32. The cured and rigidized filter is regenerable by heat to burn-off contaminant particulate collected from the engine exhaust. The pre-form may be rigidized with sol-gel, chemical vapor infiltration, ceramic bond phase, silicon carbide, or in other suitable manner.

The noted flow channels such as 28 of the pre-form have a lateral cross-sectional shape having two adjacent included angles each greater than 45° and less than 75°. Sheets 12 and 14, including wall segments 18 and 20, have a thickness less than 0.8 mm, a porosity greater than 80%, and an extension b between pleat tips less than 10 mm. In the preferred embodiment, the noted thickness is less than 0.5 mm, the noted porosity is greater than 85%, and the noted extension or length b is less than 6 mm.

Figure 3:
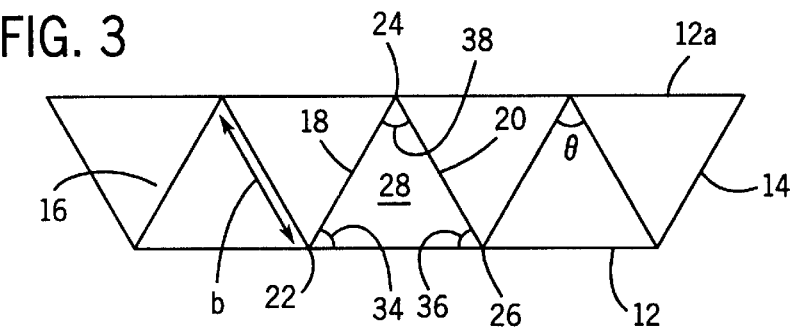
FIG. 3 is an enlarged cross-sectional view of a portion of FIG. 1.
Figure 4:
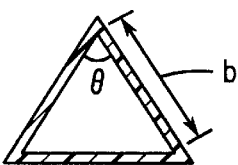
FIG. 4 is a view of a portion of FIG. 3 and includes wall dimension thickness.

The noted two adjacent included angles are provided by a first angle 34, FIG. 3, between first sheet 12 and wall segment 18 of second sheet 14, and a second angle 36 between first sheet 12 and second wall segment 20 of second sheet 14. As noted above, each of angles 34 and 36 is greater than 45° and less than 75°. In the embodiment of FIG. 3, the noted lateral cross-sectional shape of flow channel 28 consists of three pleat tips 22, 24, 26 and three included angles 34, 36, 38. Third angle 38 is between first and second wall segments 18 and 20. In preferred form, the lateral cross-sectional shape of flow channel 28 is an isosceles triangle wherein $$45° < \theta < 75°$$

$$0.5 \text{ mm} < \frac{2b \cdot \sin\frac{1}{2}\theta \cdot \cos\frac{1}{2}\theta}{1 + \sin\frac{1}{2}\theta} < 2.9 \text{ mm}$$

where θ is angle 38 between wall segments 18 and 20, and b is the noted extension or length of each of wall segment 20 between pleat tips 26 and 24 and wall segment 18 between pleat tips 22 and 24, as measured along the inside dimension of the wall, FIGS. 3, 4.

Figure 5:
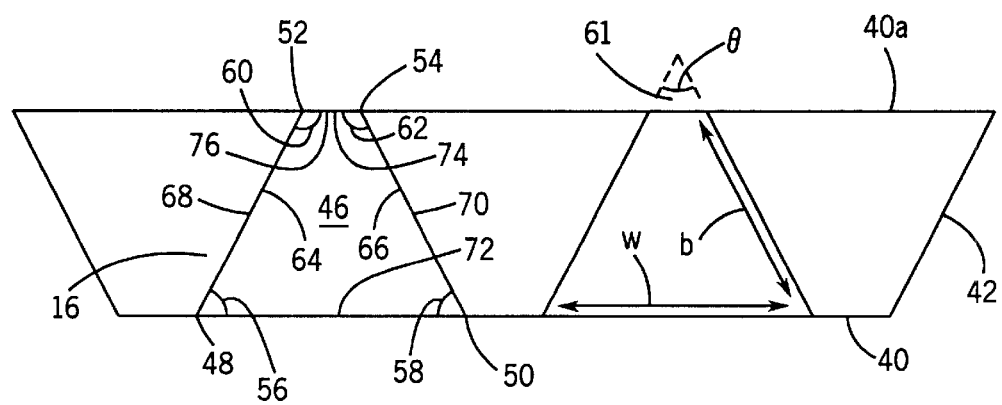
FIG. 5 is a view like FIG. 3 and shows an alternate embodiment.

FIG. 5 shows an alternate embodiment and uses like reference numerals from above where appropriate to facilitate understanding. In FIG. 5, the lateral cross-sectional shape of flow channels such as 46 consists of four pleat tips 48, 50, 52, 54 and four included angles 56, 58, 60, 62. Each of first and second angles 56 and 58 is greater than 45° and less than 75°. Each of third and fourth angles 60 and 62 is greater than 90°. The lateral cross-sectional shape is a trapezoid having first and second distally opposite sides 64 and 66 provided by wall segments 68 and 70 of pleats 20 and slanted towards each other. The trapezoid has distally opposite substantially parallel major and minor bases 72 and 74 extending laterally between sides 64 and 66. Major base 72 is longer than minor base 74. Wall segment 68 of second sheet 42 provides side 64 of the trapezoid. Wall segment 70 of second sheet 42 provides side 66 of the trapezoid. First sheet 40 provides major base 72 of the trapezoid. Second sheet 42 has a truncated wall segment 76 spanning first and second wall segments 68 and 70 and providing minor base 74 of the trapezoid. The ratio of the length of minor base 74 to the length of major base 72 is less than 0.27.

The flow channel lateral cross-sectional trapezoid shape of FIG. 5 consists of four walls, namely a first wall provided by first sheet 40 along major base 72, a second wall provided by first wall segment 68 of second sheet 42 along first side 64, a third wall provided by truncated wall segment 76 of second sheet 42 along minor base 74 and by a section of the next layer 18 of the first sheet at 40a in the spiral pattern along minor base 74, and a fourth wall provided by the second wall segment 70 of second sheet 42 along the noted second side 66. The noted first, second and fourth walls 72, 64, 66 have a single sheet thickness. The noted third wall at 74 has a double sheet thickness. The single sheet thickness of the first wall at 72 provided by first sheet 40 is less than 0.8 mm. The single sheet thickness of the second wall 64 provided by second sheet 42 at wall segment 68 is less than 0.8 mm. The double sheet thickness of the third wall 74 provided by first and second sheets 40 and 42 at 40a and 76 is less than 1.6 mm. The single sheet thickness of the fourth wall 66 provided by second sheet 42 at wall segment 70 is less than 0.8 mm. Walls 72 and 64 meet at pleat tip 48 and define angle 56. Walls 64 and 74 meet at pleat tip 152 and define angle 60. Walls 74 and 66 meet at pleat tip 54 and define angle 62. Walls 66 and 72 meet at pleat tip 50 and define angle 58. The length or height of wall 64 along wall segment 68 between pleat tips 48 and 52 is less than 10 mm, and preferably less than 6 mm. The length of wall 66 along wall segment 70 between pleat tips 50 and 54 is less than 10 mm, and preferably less than 6 mm.

Figure 6:
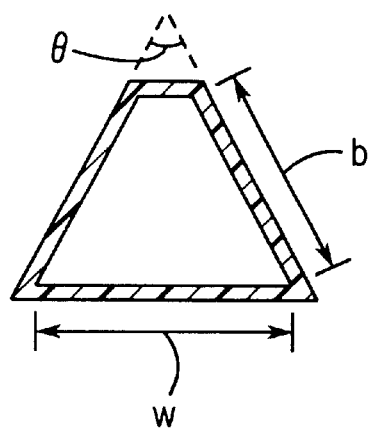
FIG. 6 is a view of a portion of FIG. 5 and includes wall dimension thickness.

In the preferred form of the embodiment of FIG. 4, $$45° < \theta < 75°,$$

$$0.5 \text{ mm} < \frac{2b \cdot \left(w - b \cdot \sin\frac{1}{2}\theta\right) \cdot \cos\frac{1}{2}\theta}{b + w - b \cdot \sin\frac{1}{2}\theta} < 2.9 \text{ mm}$$

where θ is the included angle at the intersection of projections of wall segments 68 and 70, b is the length of each of trapezoid sides 64 and 66 as measured along the inside dimension, FIGS. 5, 6, and w is the length of major base 72 as measured along the inside dimension, FIGS. 5, 6.

In one embodiment the noted wall segments are alternately sealed to each other by a first upstream set of plugs such as 78, FIG. 1, to define a first set of flow channels 80 closed by plugs 78, and a second set of flow channels 81 interdigitated with first set of flow channels 80 and having open upstream ends. The wall segments are alternately sealed to each other by a second downstream set of plugs such as shown in dashed line at 82, and as is known, closing the second set of flow channels 81. The first set of flow channels 80 have open downstream ends. This forces the exhaust from diesel engine 12 to flow through the wall segments of the media, i.e. to flow into the open upstream ends of flow channels 81, and then cross through the filter media wall segments, and then flow through the open downstream ends of flow channels 80. In an alternate embodiment, catalyst material may be disposed on the filter media, as noted above, with or without the noted plugging to provide the noted catalytic reaction.

Figure 7:
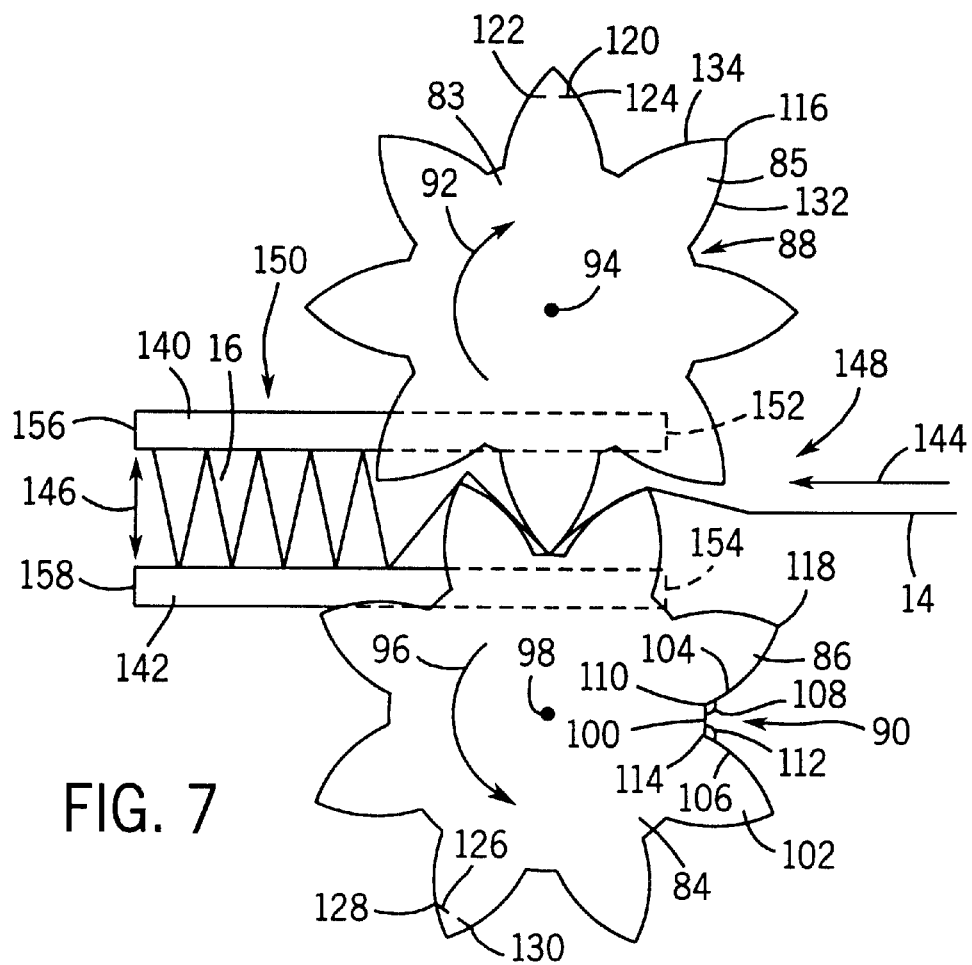
FIG. 7 is a side view showing forming apparatus in accordance with the invention.

FIG. 7 illustrates forming apparatus for the above noted pre-form. First and second star gears 83 and 84 each have a plurality of teeth 85 and 86 interdigitated with a plurality of roots 88 and 90 therebetween. The gears rotate in intermeshed relation with the tooth of one gear in the root of the other. Gear 83 rotates clockwise as shown at arrow 92 about rotation axis 94. Gear 84 rotates counterclockwise as shown at arrow 96 about rotation axis 98. Gears 83 and 84 pass second sheet 42 therebetween, and gather and fold second sheet 42 along crease lines at pleat tips 26, 28, 30, etc., which crease lines provide the noted axially extending bend lines. Each root such as 90 has a given arcuate length along an inner hub surface 100 spanning between and separating a respective pair of teeth such as 86 and 102 having sides 104 and 106 extending generally radially outwardly from opposite arcuate ends of spanning root hub surface 100. Side 104 meets spanning root hub surface 100 at a first angle 108 at a first junction point 110. Side 106 meets spanning root hub surface 100 at the second arcuate end thereof at a second angle 112 at a second junction point 114. First and second junction points 110 and 114 are spaced from each other by the noted given arcuate length of spanning root hub surface 100. Each of angles 108 and 112 is greater than 90°.

Each tooth of at least one of the gears has an outer end with a pointed tip 116 extending into a respective root and spaced from first junction point 110 by a first triangular shaped gap, and spaced from second junction point 114 by a second triangular shaped gap. In one preferred embodiment, the teeth of each of the gears have pointed tips 116 and 118 at the outer ends of the teeth. In another embodiment, each tooth of at least one of the gears has an outer end which is truncated as shown in dashed line at 120, to have first and second pointed tips 122 and 124 extending into a respective root. In a further embodiment, the teeth of the other gear may also be truncated as shown at dashed line 126, with first and second pointed tips 128 and 130 extending into a respective root.

The noted given arcuate length of spanning root hub surface 100 defines minor base 74. Sides 104 and 106 of the teeth diverge from each other as they extend radially outwardly from spanning root hub surface 100 and are spaced from each other at their outer ends along a second given arcuate length defining major base 72. In preferred form, the sides of the teeth, for example sides 132 and 134 of tooth 85, bow convexly as they extend from the outer end of the tooth generally radially inwardly to respective roots spaced on opposite sides of the tooth.

A pair of parallel guide bars 140 and 142 are spaced on opposite sides of the intermeshing of gears 83 and 84. Bars 140 and 142 extend parallel to the direction of travel 144 of second sheet 42 through the gears. The bars are spaced from each other by a gap 146 less than 10 mm along a direction perpendicular to travel direction 144 and perpendicular to the gear rotation axes 94, 98. The bars receive pleats 20 and engage pleat tips 26, 28, 30, etc. Sheet 42 is fed forwardly, leftwardly in FIG. 7, through the gears from an inlet region 148 to an outlet region 150. The guide bars have respective upstream ends 152, 154 at the gears, and downstream ends 156 and 158 at outlet region 150 and spaced leftwardly from the gears. It is preferred that upstream ends 152 and 154 of the guide bars be upstream of rotation axes 94 and 98, i.e. rightwardly of the rotation axes in FIG. 7. In the orientation of FIG. 7, the guide bars are spaced behind the gears, as illustrated in dashed line. The forming apparatus provides the preferred method of configuring and shaping the noted pre-form. In spiral wound configurations, the noted cross-sectional specifications of the channels are not met in the first several layers of pleats starting at the center.

It is recognized that various equivalents, alternatives, and modifications are possible within the scope of the appended claims. For example, spiral wound, annular, concentric, and so on, include shapes such as cylindrical, oval, racetrack shaped, and the like.

What is claimed is:

1. A green uncured pre-form for an exhaust aftertreatment filter, said pre-form comprising first and second sheets of regenerable filter media, said second sheet having a plurality of pleats defined by wall segments extending in zig-zag manner between pleat tips at axially extending bend lines, the pleat tips on one side of said second sheet being in contiguous relation with said first sheet, said flow channels having a lateral cross-sectional shape comprising two adjacent included angles each greater than 45° and less than 75°, wherein said wall segments have a thickness less than 0.8 mm, a porosity greater than 80%, and an extension between pleat tips less than 10 mm.

2. The pre-form according to claim 1 wherein said media comprises a high temperature composite ceramic filter media comprising a plurality of haphazardly arranged ceramic fibers.

3. The pre-form according to claim 2 wherein the fibers have a length in the range of 0.01 to 10.0 mm and an average diameter in the range of 1 to 20 microns.

4. The pre-form according to claim 2 wherein the ceramic fibers are high purity alumina having less than 5% silica and other impurities.

5. The pre-form according to claim 1 wherein said media comprises a mixture of haphazardly arranged ceramic fibers and organic fibers and a thermoplastic resin bonding said fibers together.

6. The pre-form according to claim 5 wherein said media comprises 50% to 80% by weight ceramic fibers, 10% to 50% by weight organic fibers, and 2% to 20% by weight thermoplastic resin.

7. The pre-form according to claim 6 wherein said media has a porosity of 80% to 95% and a mean flow pore diameter of 5 to 15 microns.

8. The pre-form according to claim 5 wherein ceramic fibers comprise high purity alumina.

9. The pre-form according to claim 5 wherein said organic fibers comprise a combination of wood fibers and fibrillated organic fibers.

10. The pre-form according to claim 9 wherein the fibrillated fibers comprise aramid resin pulp.

11. The pre-form according to claim 1 wherein each of said sheets comprises a plurality of haphazardly arranged ceramic fibers, and comprising an inorganic binder bonding the pleat tips of said second sheet to said first sheet.

12. The pre-form according to claim 11 wherein each of said sheets further comprises a plurality of organic fibers and a thermoplastic resin bonding said fibers together.

13. The pre-form according to claim 1 wherein said pre-form has less than 20% by weight incinerable material.

14. The pre-form according to claim 1 wherein each of said first and second sheets of said pre-form has greater than 80% by weight of fibers selected from the group consisting of ceramic fibers and inorganic fibers.

15. The pre-form according to claim 1 wherein each of said first and second sheets has a thickness less than 0.5 mm.

16. The pre-form according to claim 1 wherein each of said first and second sheets has a porosity greater than 85%.

17. The pre-form according to claim 1 wherein said wall segments have an extension along said second sheet between pleat tips less than 6 mm.

18. A green uncured pre-form for an exhaust aftertreatment filter, said pre-form comprising first and second sheets of regenerable filter media, said second sheet having a plurality of pleats defined by wall segments extending in zig-zag manner between pleat tips at axially extending bend lines, the pleat tips on one side of said second sheet being in contiguous relation with said first sheet, said flow channels having a lateral cross-sectional shape comprising two adjacent included angles each greater than 45° and less than 75°, wherein said two adjacent included angles comprise a first angle between said first sheet and a first said wall segment of said second sheet, and a second angle between first sheet and a second said wall segment of said second sheet, each of said first and second angles being greater than 45° and less than 75°, said lateral cross-sectional shape of said flow channels consists of three pleat tips and three included angles, namely said first angle, said second angle, and a third angle between said first and second wall segments, and said lateral cross-sectional shape is an isosceles triangle and wherein $$45° < \theta < 75°$$

$$0.5 \text{ mm} < \frac{2b \cdot \sin\frac{1}{2}\theta \cdot \cos\frac{1}{2}\theta}{1 + \sin\frac{1}{2}\theta} < 2.9 \text{ mm}$$

where θ is said third angle between said first and second wall segments, and b is the length of each of said first and second wall segments.

19. A green uncured pre-form for an exhaust aftertreatment filter, said pre-form comprising first and second sheets of regenerable filter media, said second sheet having a plurality of pleats defined by wall segments extending in zig-zag manner between pleat tips at axially extending bend lines, the pleat tips on one side of said second sheet being in contiguous relation with said first sheet, said flow channels having a lateral cross-sectional shape comprising two adjacent included angles each greater than 45° and less than 75°, wherein said two adjacent included angles comprise a first angle between said first sheet and a first said wall segment of said second sheet, and a second angle between first sheet and a second said wall segment of said second sheet, each of said first and second angles being greater than 45° and less than 75°, and said lateral cross-sectional shape of said flow channels consists of four pleat tips and four included angles.

20. The pre-form according to claim 19 wherein said lateral cross-sectional shape comprises an isosceles trapezoid.

21. The pre-form according to claim 20 wherein said trapezoid has two acute angles equal to each other, two obtuse angles equal to each other, and two sides of equal length.

22. The pre-form according to claim 19 wherein said lateral cross-sectional shape comprises a trapezoid having first and second distally opposite sides slanted towards each other and having distally opposite substantially parallel major and minor bases extending laterally between said sides, said major base being longer than said minor base, said first wall segment of said second sheet providing said first side of said trapezoid, said second wall segment of said second sheet providing said second side of said trapezoid, said first sheet providing said major base of said trapezoid, said second sheet having a truncated wall segment spanning said first and second wall segments and providing said minor base of said trapezoid, the ratio of the length of said minor base to the length of said major base being less than 0.27.

23. The pre-form according to claim 22 wherein said sheets are wound in a spiral, and said flow channel lateral cross-sectional trapezoid shape consists of four walls, namely a first wall provided by said first sheet along said major base, a second wall provided by said first wall segment of said second sheet along said first side, a third wall provided by said truncated wall segment of said second sheet along said minor base and by a section of the next layer of said first sheet in said spiral pattern along said minor base, and a fourth wall provided by said second wall segment of said second sheet along said second side, said first, second and fourth walls have a single sheet thickness, said third wall has a double sheet thickness, the single sheet thickness of said first wall being provided by said first sheet and being less than 0.8 mm, the single sheet thickness of said second wall being provided by said second sheet and being less than 0.8 mm, the double sheet thickness of said third wall being provided by said first and second sheets and being less than 1.6 mm, the single sheet thickness of said fourth wall being provided by said second sheet and being less than 0.8 mm, wherein said first and second walls meet at a first of said pleat tips and define said first angle, said second and third walls meet at a second of said pleat tips and define a third of said angles, said third and fourth walls meet at a third of said pleat tips and define a third of said angles, said fourth and first walls meet at a fourth of said pleat tips and define said second angle, said first angle at said pleat tip is greater than 45° and less than 75°, said third angle at said second pleat tip is greater than 90°, said fourth angle at said third pleat tip is greater than 90°, said second angle at said fourth pleat tip is greater than 45° and less than 75°, and wherein the length of said second wall between said first and second pleat tips is less than 10 mm, and the length of said fourth wall between said third and fourth pleat tips is less than 10 mm.

24. The pre-form according to claim 19 wherein said lateral cross-sectional shape comprises a trapezoid having first and second distally opposite sides slanted towards each other and having distally opposite substantially parallel major and minor bases extending laterally between said sides, said major base being longer than said minor base, said first wall segment of said second sheet providing said first side of said trapezoid, said second wall segment of said second sheet providing said second side of said trapezoid, said first sheet providing said major base of said trapezoid, said second sheet having a truncated wall segment spanning said first and second wall segments and providing said minor base of said trapezoid, wherein $$45° < \theta < 75°,$$

$$0.5 \text{ mm} < \frac{2b \cdot \left(w - b \cdot \sin\frac{1}{2}\theta\right) \cdot \cos\frac{1}{2}\theta}{b + w - b \cdot \sin\frac{1}{2}\theta} < 2.9 \text{ mm}$$

wherein θ is the included angle between the intersection of projections of said first and second wall segments, b is the length of each of said first and second sides of said trapezoid, and w is the length of said major base of said trapezoid.

25. A method of making a green uncured pre-form for an exhaust aftertreatment filter, comprising providing first and second sheets of regenerable filter material, forming a plurality of pleats in said second sheet defined by wall segments extending in zig-zag manner between pleat tips at axially extending bend lines, bonding the pleat tips on one side of said second sheet to said first sheet to define axial flow channels, forming said flow channels having a lateral cross-sectional shape comprising two adjacent included angles greater than 45° and less than 75°, and providing said wall segments with a thickness less than 0.8 mm, a porosity greater than 80%, and an extension between pleat tips less than 10 mm.

26. A method of making a green uncured pre-form for an exhaust aftertreatment filter, comprising providing first and second sheets of regenerable filter material, forming a plurality of pleats in said second sheet defined by wall segments extending in zig-zag manner between pleat tips at axially extending bend lines, bonding the pleat tips on one side of said second sheet to said first sheet to define axial flow channels, forming said flow channels having a lateral cross-sectional shape comprising two adjacent included angles greater than 45° and less than 75° wherein each of said sheets comprises 50% to 80% by weight ceramic fibers, 10% to 50% by weight organic fibers, and 2% to 20% by weight thermoplastic resin.

27. A method of making a green uncured pre-form for an exhaust aftertreatment filter, comprising providing first and second sheets of regenerable filter material, forming a plurality of pleats in said second sheet defined by wall segments extending in zig-zag manner between pleat tips at axially extending bend lines, bonding the pleat tips on one side of said second sheet to said first sheet to define axial flow channels, forming said flow channels having a lateral cross-sectional shape comprising two adjacent included angles greater than 45° and less than 75°, wherein each of said first and second sheets has a porosity of 80% to 95% and a mean flow pore diameter of 5 to 15 microns.

* * * * *